July 11, 1961     K. B. WILLIAMS     2,991,588
EYES FOR DOLLS, SOFT TOYS, FURS FOR WEAR AND THE LIKE
Filed May 19, 1958
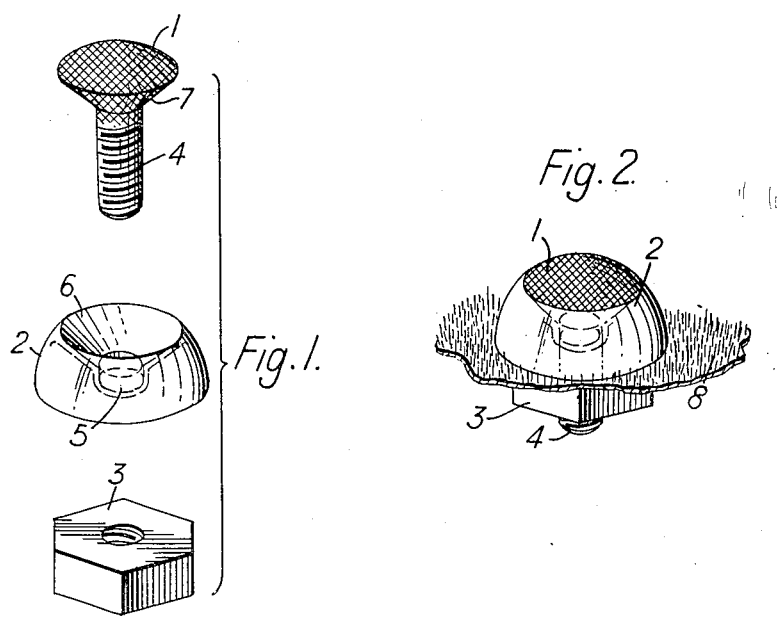
Inventor
KENNETH Brook Williams
By Shoemaker & Mattare
Attorneys

United States Patent Office 2,991,588
Patented July 11, 1961

2,991,588
EYES FOR DOLLS, SOFT TOYS, FURS FOR WEAR AND THE LIKE
Kenneth B. Williams, Crickhowell, Brecon, Wales, assignor to Wendy Boston Playsafe Toys Limited, a corporation of Great Britain
Filed May 19, 1958, Ser. No. 736,029
3 Claims. (Cl. 46—165)

This invention relates to toys, furs for wear and the like with more especial reference to dolls and soft toys simulating animals or other creatures and the principal object of the invention is to provide an improved arrangement and mounting for the eyes of such creatures which is rustproof and consequently washable and which has sufficient flexibility to be put through a domestic wringer.

In my British Patent No. 694,512 an improved construction of eye for dolls and soft toys comprising an appropriately shaped component simulating an eye is described which is recessed at the rear to co-operate with a clamping member having a flange which engages the rear of the cloth or like of which the toy is formed, this recess being preferably screw-threaded to take a threaded projection on the clamping member, such clamp member being of metal.

According to the present invention an improved arrangement of eye for dolls and soft toys comprises an appropriately shaped component simulating an eye which is of moulded plastic material and which has a screw-threaded stem also of plastic material adapted to be positioned in the eye socket or eye aperture of the toy and to receive a clamping nut similarly formed of plastic material.

The synthetic resinous screw threaded stem is formed with a black head to simulate the pupil of the eye. Several synthetic resinous compositions are suitable for the screw-threaded stem and nut components, black nylon being appropriate for the stem although polyethylene, polurethane, and other polyesters may also be employed and it will be appreciated that a different coloured material may be used for the nut.

One embodiment of the invention is shown in the accompanying drawings in which:

FIGURE 1 shows the components before assembly and in

FIGURE 2 the components are assembled in the eye socket of a toy animal.

Referring now to the drawings, an eye for a toy animal is formed of a pupil and an iris, generally designated 1 and 2 respectively. The pupil 1 is formed with a threaded stem 4, while the iris 2 is formed with an aperture 5 and a seat 6, which accommodates a suitably shaped portion 7 on the pupil 1. On assembly the threaded stem of the pupil is passed through the aperture 5 and the fur or other substance simulating the skin of the animal 8 and the nut 3 is screwed home effectively to secure the pupil and iris in position, the external surface of the two being smooth and unbroken. The pupil 1 is moulded of black nylon, the iris of amber flexible polystyrene and the nut of nylon of any colour.

The advantages of this construction are firstly that the nylon absorbs water and swells so that the nut and screw are effectively bonded together following the absorption of atmospheric moisture and, secondly, that any attempt to unscrew the eye from outside the toy is frustrated in that the only component that can be gripped, the amber iris, will merely revolve on the stem of the pupil.

By the present invention an improved arrangement of eye for dolls and the like is obtained which is rust-proof and sufficiently flexible to be passed through a washing machine while the mounting member may be so coloured as to form the pupil of the eye.

Lastly the invention enables dolls and toys to be formed containing no metal whatsoever.

What I claim is:
1. An eye for toys, said eye comprising an iris portion having an aperture therethrough, a pupil portion having a threaded stem, the threaded stem passing through said aperture, and a nut threaded and frictionally locked on the stem for maintaining the pupil portion in a stationary position relative to the iris portion, the iris portion being freely rotatabl around the threaded stem whereby only the iris is free to move when the eye is attached to a toy with a portion of the toy secured between the nut and the iris portion.

2. An eye for toys, said eye comprising an iris portion having a rear side and a rounded front surface, said portion having a circular recess in said surface tapering inwardly and joining an aperture passing through the rear side, a pupil portion having a rounded top surface and a tapered under side formed to fit in said tapering recess, the pupil portion when seated in said recess having its rounded top surface flush with the rounded front surface of the iris portion, said pupil portion further including a threaded stem forming a continuation of the tapered underside and passing through said aperture, the iris portion being freely rotatable on said stem, and a nut threaded on the stem and frictionally locking the stem and nut thus forming a single unit with the iris portion disposed between the nut and pupil.

3. The invention according to claim 2 wherein the pupil portion is formed of black nylon and said iris portion is formed of polystyrene.

References Cited in the file of this patent
UNITED STATES PATENTS

| | | |
|---|---|---|
| 2,466,278 | Rupert | Apr. 5, 1949 |

FOREIGN PATENTS

| | | |
|---|---|---|
| 634,614 | Great Britain | Mar. 22, 1950 |
| 646,745 | Great Britain | Nov. 29, 1950 |

OTHER REFERENCES
Fastener's Magazine, vol. 10, No. 4, pp. 8–10 cited.
Du Pont Bulletin, No. 50, 1954 (3 pages).